United States Patent Office 3,606,046
Patented Sept. 20, 1971

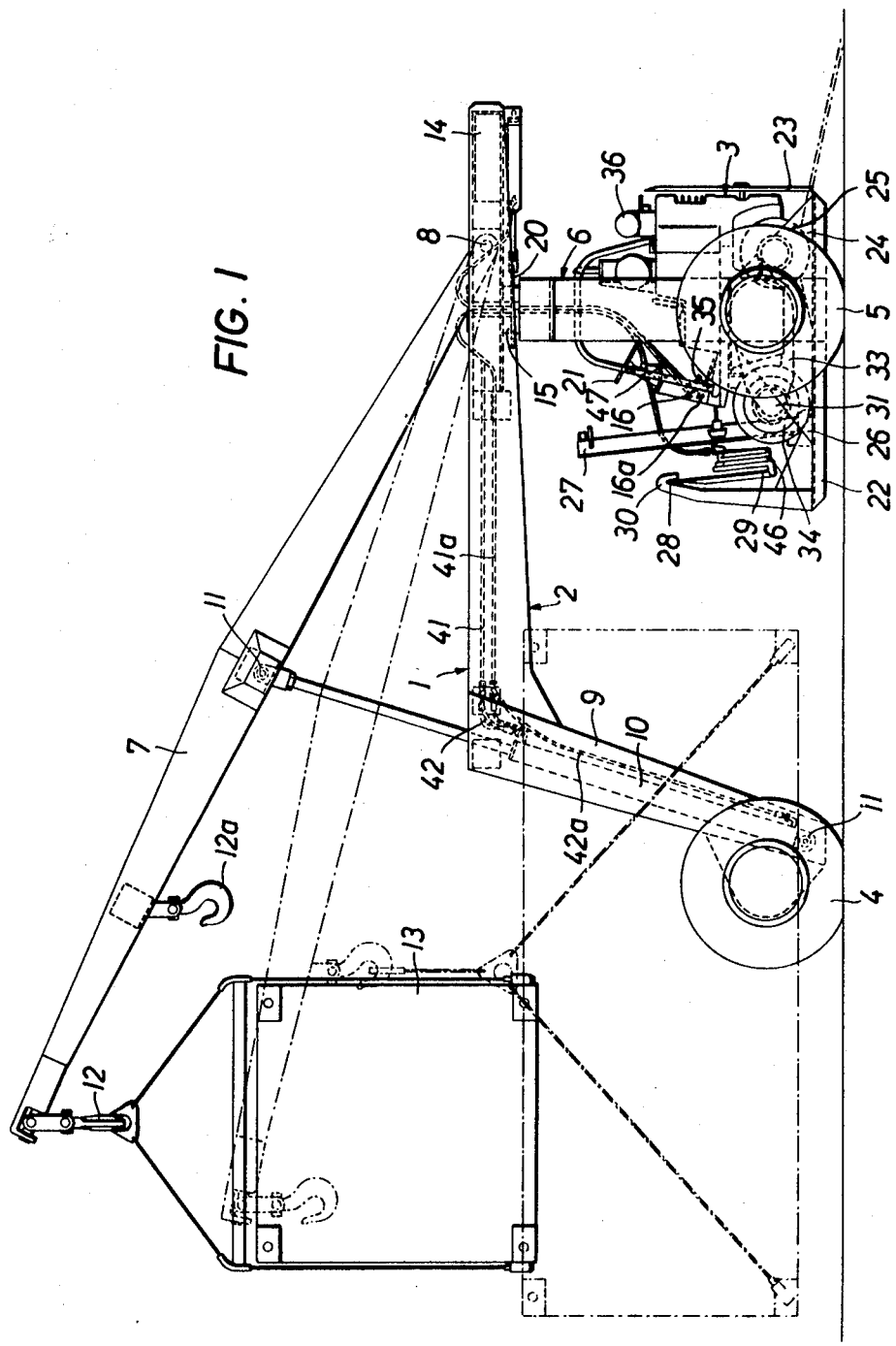

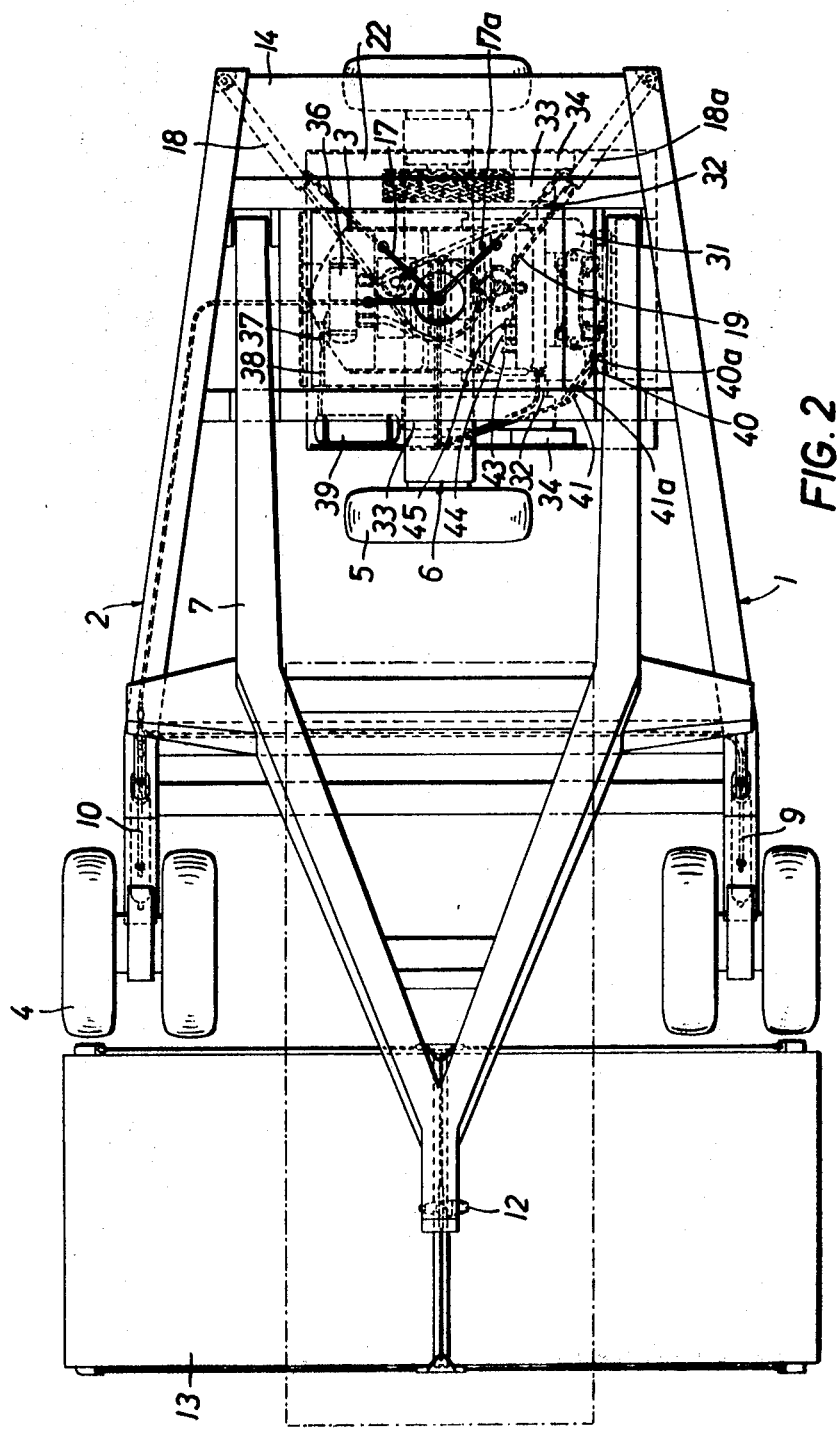

3,606,046
CONTAINER HANDLING VEHICLE
Karl-Heinz Griesenbrock, Duisburg, Germany, assignor to Eaton Yale & Towne, Inc., Cleveland, Ohio
Filed Mar. 2, 1970, Ser. No. 15,665
Int. Cl. B66c 23/00
U.S. Cl. 214—130R          5 Claims

ABSTRACT OF THE DISCLOSURE

A materials handling device includes a wheeled frame, a lifting boom, and frame supported platform upon which a self-propelled vehicle can be driven for supplying power for propulsion, lifting and braking of the mobile frame.

BACKGROUND OF THE INVENTION

(1) Field of invention

This invention relates to a mobile handling unit for containers and other heavy loads, and more particularly to a mobile handling unit for handling containerized freight.

(2) Discussion of the prior art

Handling or transportation units for containerized freight and other heavy loads, which are either designed as special-purpose vehicles with an incorporated drive and control unit or consist of a loading or load carrying portion and a driving portion specially manufactured for that purpose and capable of being connected to the latter, are known in the art. Where large quantities of containerized freight or other heavy loads are to be handled, a profitable use of such specially designed equepment is possible even though the capital expenditure required is considerable. In many cases, however, the quantities of containerized freight to be handled are so small that the special-purpose vehicle described above may not be profitably utilized. Therefore, it has been suggested in the art to drive a mobile frame provided with a lifting device for handling the loads by means of a second powered vehicle, such as an industrial lift truck, by connecting the two vehicle parts using a more or less conventional towing arrangement. Reference, the Journal of Commerce, International Edition, Oct. 21, 1968. Although this solution would considerably reduce the capital expenditure in cases where the quantities of containers to be handled is small, it is not fully satisfactory as the maneuverability of a handling unit coupled in the form of a trailer is very poor, especially since the longitudinal dimension of the vehicle is considerably increased over a custom designed vehicle. Moreover, in units known in the art, the mobile frame provided with the lifting device, needs a drive unit of its own for operating the lifting device unless the drive unit of the second powered vehicle is also used for operating the lifting device on the mobile frame.

SUMMARY OF INVENTION

It is a primary object of this invention to find a solution which offers the advantages of a handling unit described above, that is, low investment costs, but whose maneuverability is considerably improved and which requires a considerably reduced space in which to operate. With regard to a handling unit for heavy loads, particularly for containerized freight, its is particularly advantageous to have a mobile frame with a lifting device for handling the load and moved by a self-propelled vehicle which can also be used for other purposes such as an industrial lift truck. It is suggested, according to this invention, that the self-propelled vehicle, be of a type which is normally equipped with a hydraulic system, that can be moved onto the mobile frame to a position within the outer contours of the frame where special preparations have been made for this purpose and connected to it. The driving vehicle is also equipped with connections for driving, braking and steering the mobile frame as well as for operating the lifting device in such a manner that all control functions which are necessary in order to operate the handling unit can be derived from the driving vehicle. Owing to this particular arrangement, the entire construction is very compact, especially when the unit is equipped as described in detail in the following specification.

Another significant advantage of the unit to be described is that the driving vehicle which is to be moved onto the mobile frame, when appropriately positioned serves so that the lifting device can project beyond the mobile frame.

Further economies can be effected when the driving vehicle is a lift truck of a size small enough to enter a container which can be handled by the lifting device for the purpose of loading and unloading the container. This will considerably reduce the costs incurred for the handling of containers so that a profitable solution is also possible in cases where the quantities to be handled are small.

An advantageous solution is achieved when the steering mechanism and the brake of the mobile frame as well as the lifting device are hydraulically operated by the hydraulic system of the driving vehicle while the mobile frame is driven in a simple way by the drive axle of the driving vehicle via intermediate shafts and transmission arrangement. The maneuverability of the container handling unit and the counterweight effect is increased if the rear end of the mobile frame is provided with a steering and driving portion pivoted about a vertical axis and having a platform on which the driving vehicle is placed. A pivoted bogie of this type provides a swing of at least 90° without difficulty, which means that all necessary maneuvers can be carried out easily within the length of the mobile frame. Furthermore, the full weight of the driving vehicle can be used to counterbalance the weight of a lifting device projecting forwardly of the axle at the opposite end of the mobile frame.

On the platform, trough-shaped impressions can be formed to immobilize the unpowered rear wheels of the lift truck serving as the driving vehicle and a supporting bar can be provided for jacking up the driving axle of the lift truck. It is recommended that the supporting bars be arranged beneath the lifting mast of the lift truck in such a way that the front axle can be raised or lowered by appropriate manipulation of the tilting of the lift truck mast. Furthermore, the platform of the mobile frame can be provided with rigidly mounted engaging hooks extending in a downward direction for engaging the loose ends of the lift truck fork, which in the embodiment to be described can be folded upwardly into a vertical position. When the fork carriage of the lift truck is raised, thereby engaging the fork with the hook, the lift truck is thereby rendered immovable relative to the mobile frame.

Furthermore, the platform of the mobile unit can be provided with a ramp which can be folded upwardly and connected to the lift truck when the latter has been moved onto the platform. This serves as an additional means of locking the driving vehicle relative to the mobile frame.

To accomplish steering, the steer and drive portion of the mobile frame can be turned relatively to the mobile frame by means of hydraulic cylinders mounted on the mobile frame and attached to the steer and drive portion thereof. The gantry-like portion of the mobile frame is provided with wheels which support the frame for movement but which are not driven and not steered.

Other features and advantages of the invention of the present application will become immediately apparent by reference to the accompanying drawing and following specification.

BRIEF DESCRIPTION OF THE DRAWING

FIG. 1 is a side view of a handling unit according to the principles of the present invention with the steering and driving unit positioned in a longitudinal direction.

FIG. 2 is a top plan vew of the handling unit according to the principles of the present invention with the steering and driving unit positioned in a transverse direction.

DESCRIPTION OF A PREFERRED EMBODIMENT

The entire handling unit which is indicated at 1 consists primarily of a mobile frame 2 and an industrial lift truck 3 of conventional design which is capable of being moved onto the movable frame into a position within the outer contours of the mobile frame, the mobile frame being specially adapted for this purpose. A lift truck of such a size as to be able to load and unload the containers to be handled is particularly advantageous. The front end of the mobile frame has the form of a gantry and is provided with wheels 4 which are in contact with the ground and which are not steered and are not driven. While the steered and driven wheels 5 are arranged at the rear end of the mobile frame on a gantry-like steering and driving unit 6 pivoted about a vertical axis 15 relatively to the mobile frame. A beam 7 extending in a longitudinal direction relative to the mobile frame 2 is pivoted at the rear end of the mobile frame at a point indicated at 8 in the drawing which can be moved in a vertical plane by means of two hydraulic cylinders 10 which are mounted on the inclined gantry post 9 at the front end of the mobile frame. Said hydraulic cylinders 10 being pivoted to the lower end of the gantry post 9 and to the beam 7 by means of hinged bearings 11. At the front end of the beam 7 a load hook 12 is provided for picking up a transversely positioned load 13 as well as a second load hook 12A by means of which a longitudinally oriented load extending into the opening formed by the gantry-like front end of the mobile frame can be handled is indicated by the dotted lines in the drawing. At the extreme rear end of the mobile frame 2, a counterweight 14 is arranged. The main counterbalancing effect is, however, produced by the steering and driving unit 6. Upon moving the lift truck 3 between the gantry posts of the steering and driving unit 6, for which purpose the steering and driving unit 6 is provided with a platform 22 fitted with a ramp 23 which can be folded upwardly. The platform 22 is provided with depressions 24 for the rear wheels 25 of the lift truck 3, which are not driven, as well as with a supporting block 26 arranged below the lifting mast 27 of the lift truck 3 in such a manner that after the wheels 25 have engaged the depressions 24 the drive axle 31 of the lift truck can be raised a little by tilting the lifting mast 27 of the lift truck 3 in a forward direction. Furthermore, a platform 22 is provided with engaging hooks 30 extending in a downward direction which engage the ends 28 of the forks 29 when the fork carriage 46 of the lift truck 3 is raised in a manner that the lift truck 3 is rendered immovable relative to the steering and driving unit 6. As an additional means of securing the lift truck, the ramp 23 can also be connected with the fork truck 3 after having been folded upwardly. The drive axle 31 of the lift truck 3 acts upon the driven wheel 5 of the steering and driving unit 6 via disengageable driveshafts 32 and a reduction gear 33. The reduction gear 33 is provided with brakes 34 which brake the driven wheel 5 and which may be actuated by an auxiliary compressed air brake system 36 on the lift truck 3 coacting with the normal brake system 35 of the lift truck 3 through a disengageable brake connection 37, a brake line 38 and a compressed air brake system on the mobile frame.

As is shown in FIG. 2, the lift truck 3 is further provided with hydraulic connections 40 and 40A from which hydraulic lines 41 and 42 and 41A and 42A respectively lead to the lifting cylinders 10 on the mobile frame 2. The hydraulic connections 40 and 40A form a part of the standard equipment for a normal lift truck where they are used for example for operating a side-shifting attachment for shifting the fork carriage. The lifting cylinders 10 are controlled by a control lever 43 and the operation of the lifting mast 27 and the lift truck 3 is controlled by control valve levers 44 and 45 on the lift truck 3. The fork 29 can be fixed in vertical position at the fork carriage 46 for movement into the engaging hooks 30. The lift truck 3 is provided with a locking bar 47 for locking the control valve levers 44 and 45. The steering and driving unit 6 is turned by the hydraulic steer system of the lift truck through disengageable hydraulic connections 16 and 16A respectively and the hydraulic lines 17 and 17A respectively, the latter leading to the steering cylinders 18 and 18A respectively which are arranged in horizontal position in the mobile frame 2 and whose piston rods are connected with a steering chain 19 which is placed around the steering chain wheel 20 which is connected to the steering and drive unit 6. Steering is effected by means of a steering wheel 21 of a lift truck 3 so that all control functions required in order to operate the entire handling unit 1 can be performed by the lift truck driver when the driver sits upon the lift truck 3 in the same manner or in a similar manner as if they were to be performed when the lift truck is used for its normal purposes. The handling unit is made ready for operation by moving the driving vehicle 3 which is normally used as a lift truck over the ramp 23 onto the platform 22 in such a manner that the steered rear wheels 25 engage the trough-shaped impressions 24 in the platform 22 and the lifting mast 27 extends vertically above the supporting block 26. Tilting the lifting mast 27 in a forward direction through actuation of the control valve lever 44, the driving axle of the lift truck is raised to the point where the wheels are no longer in contact with the platform 22. By raising the fork carriage 46 through actuation of the control valve lever 45 the lift truck 3 is fixed on the platform by engagement of the fork ends 28 with a hook 30. As an additional means of securing the driving vehicle 3 with respect to the platform 22, the ramp 23 can be connected with the lift truck 3. Thereafter, the control valve levers 44 and 45 are locked by means of the locking bar 47 to prevent accidental movement of the levers. Thereafter, the drive unit of the lift truck is connected to the mobile frame by engaging the driveshaft 32. Thereafter, the auxiliary compressed air brake system 36 is connected with the compressed air brake system 39 through the brake line 38 at the disengageable brake connection 37. The steering systems are connected by connecting the hydraulic 17 and 17A with the respective steering connections 16 and 16A. This will automatically interrupt the lines leading to the steering cylinder of the lift truck 3 which are not shown in the drawing. Finally, the hydraulic lines 41 and 41A are connected with the hydraulic connections 40 and 40A for operation of the lifting cylinders 10 on the mobile frame 2. The handling unit is now ready for operation. It will be appreciated that the described preparations which are necessary in order to make the handling unit ready for operation are very easy and require a minimum of time. The same applies to the work of loosening the connection between the lift truck and the handling unit in order to use the lift truck for its normal purposes. It will be further appreciated that the entire handling unit 1 is a highly maneuverable vehicle owing to its pivoted steering and driving unit 6 and that it is a special advantage that the full weight of the lift truck 3 can be used as a counterweight so that a considerable portion of the beam 7 may project beyond the handling unit 1. The invention of the present application, of course, is not limited to the use of a conventional industrial lift truck as the power means for the mobile frame 1, but instead of a lift truck, other powered vehicles are also usable for that purpose. The combination with the lift truck is, of course, a special advantage as the lift truck can also be used for loading and unloading the containers to be handled by the handling unit 1. Furthermore, the use of the lift truck has a special advantage as the lift truck can be secured on the mobile frame by raising the fork carriage in the described manner. Instead of the load hooks 12 and 12A shown in the drawing, any other load carrying means can, of course, be used. For example, a load hook movable in a longitudinal direction, a winch, a lifting mast or the like may be used. Instead of the pivoted steering and driving unit 6 another type of undercarriage construction could also be used. The use of the basic concept of the invention is, however, essential. This basic concept consists in that a vehicle usable for other purposes can be moved into a specially prepared mobile frame to a position within the outer contours of the frame and can be connected to it to form a compact and therefore highly maneuverable handling unit requiring a relatively low capital expenditure.

Having thus described my invention, I now claim:

1. A mobile load handling unit comprising:
a frame including a first fixed wheeled axle, a second steerable, drive axle pivotal with respect to the fixed axle;
hydraulic steering means for pivoting the steerable, drive axle with respect to the fixed axle,
a boom pivotally attached to the frame;
hydraulic cylinder means attached to the frame and the boom for raising and lowering the boom with respect to the frame;
a mobile power source comprising a self-propelled vehicle carried within the frame on the drive axle, the self-propelled vehicle including auxiliary power take-off means;
means operatively connecting the propelling means of the vehicle to the steered, drive axle for supplying rotary driving power thereto; and
means operatively connecting the power take-off means of the vehicle to the hydraulic steering means and to the hydraulic cylinder means for raising and lowering the boom for supplying power thereto.

2. The load handling unit of claim 1 wherein the self-propelled vehicle further includes:
independent control means for controlling the supply of power to the steering cylinder and to the boom raising and lowering cylinder.

3. The load handling unit of claim 2 wherein the frame is provided with a hydraulic wheel brake system on one of the axles; and
the power take-off means is operatively connected to the frame brake system for supplying power thereto.

4. The mobile handling unit of claim 3 wherein the control means provided for controlling the operation of the steering cylinder, the boom raising and lowering cylinder and the brake system comprise controls provided for the steering, operation and braking of the self-propelled vehicle.

5. The mobile handling unit of claim 4 wherein the self-propelled vehicle is an industrial lift truck having power take-off means for steering, lifting and lowering a load carriage and braking,
means for interrupting supply of power to lift truck steering, lifting and lowering of the load carriage, and braking, and
means for connecting the power take-off means to the corresponding functions on the frame.

References Cited
UNITED STATES PATENTS

| 2,522,068 | 9/1950 | Stallard | 180—1C |
| 1,966,866 | 7/1934 | Miller | 214—44 |
| 1,698,172 | 1/1929 | Ronk | 105—159X |

GERALD M. FORLENZA, Primary Examiner

J. M. FORSBERG, Assistant Examiner

U.S. Cl. X.R.

180—1C